United States Patent Office 3,429,587
Patented Feb. 25, 1969

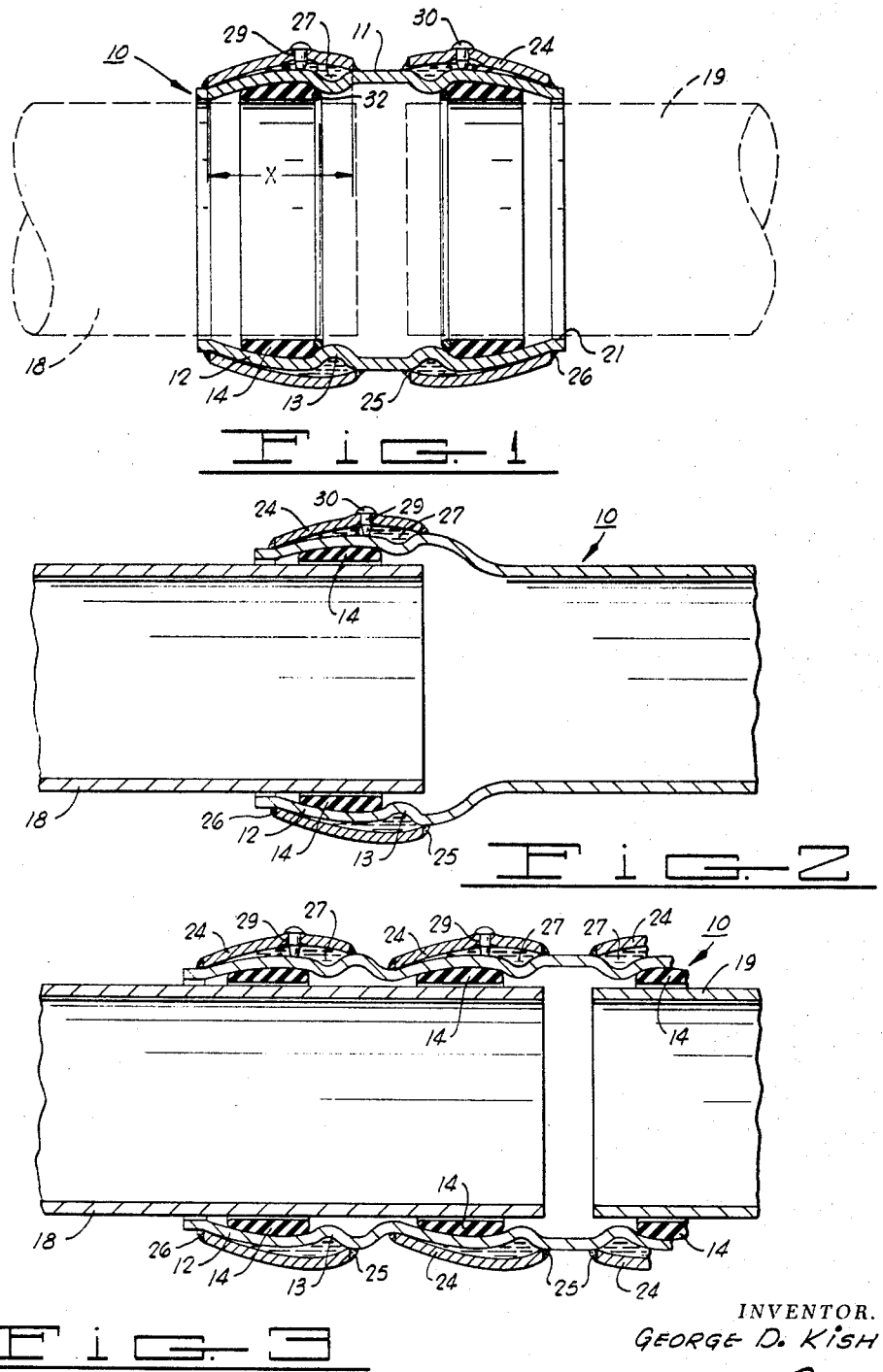

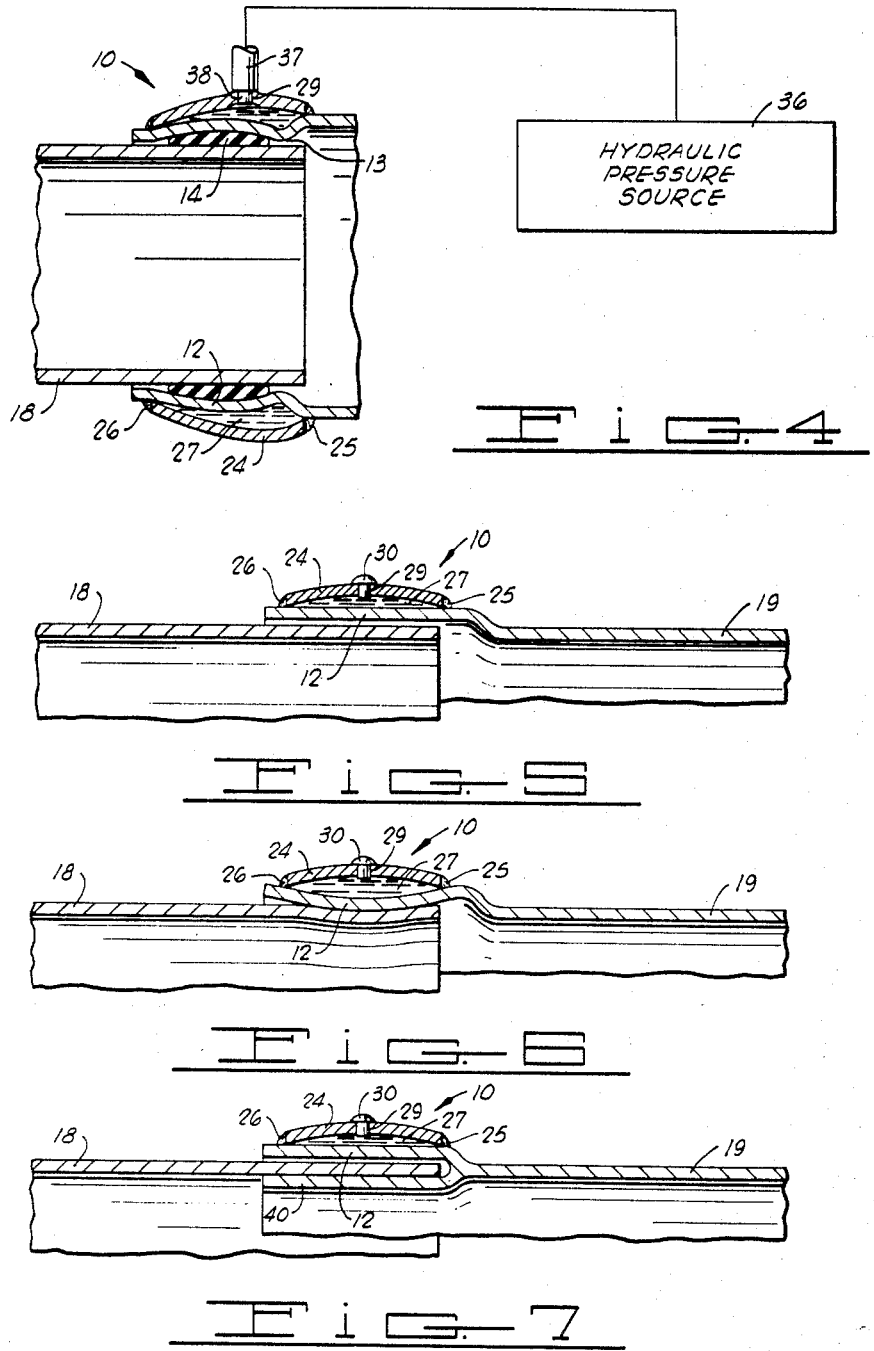

3,429,587
PIPE COUPLINGS
George D. Kish, Bradford, Pa., assignor to Dresser Industries, Inc., Dallas, Tex., a corporation of Delaware
Filed Mar. 3, 1967, Ser. No. 620,309
U.S. Cl. 285—18         12 Claims
Int. Cl. F16l *17/02, 21/02*

ABSTRACT OF THE DISCLOSURE

A pipe coupling device formed of a tubular shell having an annular outer ring secured, arched and pressure-tight about each end portion of the shell to provide a pressure-tight chamber between the shell and ring. An aperture in each of the rings permits application of fluid pressure within each end chamber sufficient to deform the shell inwardly thereat urging the shell or a contained gasket into uniform pressure seal engagement against received pipe sections to be coupled.

Background of the invention (1) The art to which the invention pertains includes the art of piping and pipe couplings for the formation of pipe joints. More specifically the invention relates to pipe couplings of the type in which the hold or grip between the pipe and the coupling is achieved by physical deformation of either or both to effect a leakproof locking engagement therebetween.

(2) The use of couplings and the like for the forming of pipe joints is well known. By means of prior art devices, it has been usual to couple pipes by either bolting or mechanical crimping or swaging to constrict the coupling into a pressure-tight seal with the opposing pipe sections. Where gaskets are employed, either of these prior types draw or force the contained gasket into tight, leak-proof engagement with the respective pipe sections. The latter type are exemplified in the prior art by U.S. Patents 3,149,861; 3,210,102; 3,244,441; 3,103,068; and 2,479,702; and British Patent 511,527.

While each of these devices noted by the above cited patents are regarded as feasible under the appropriate circumstances for which they were intended, it should be apparent that each requires a specifically adapted mechanical tool capable of somehow crimping or swagging either the coupling, pipe or both in an encircling engagement to effect the required interlock. Not only therefore do each of these require a special, expensively fabricated tool adapted to perform the specific operational function, but of necessity the environmental conditions under which the joint is formed must enable operational access to the entire affected peripheral pipe sections. That is, it is not uncommon to form pipe joints in place in crowded areas of restricted access in which formation of pipe joints with such prior art devices would be impractical, if not impossible. Typical of this later condition are situations in which it is called upon to couple piping supported on the ground or in trenches in which encircling access to the joint area is either difficult or impossible. Therefore, such devices are not only expensive by virtue of the time and equipment involved to form the joint, but at the same time their utility under many conditions of use is very much restricted.

Summary

This invention relates to a novel coupling device for the joining of pipe sections in a leakproof joint and more specifically relates to a novel pre-formed coupling device capable of being hydraulically forged controllably through self contained structure for effecting a mechanical seal with received pipe sections to be joined.

By means of the invention hereof, the above noted disadvantages are overcome in an inexpensive manner with a coupling device which permits quickly forming a positive hold, leakproof joint by the mere application of a hydraulic pressure as from a portable hydraulic grease gun. Pressure is applied through a pre-formed access port connecting to an annular chamber in which pressure effects an encircling deformation on the coupling shell to produce the mechanical seal necessary for a leakproof joint. Since forming the joint requires only seconds to perform and access sufficient only to insert a hydraulic hose or the like into the port provided, the labor and equipment costs involved for forming the joint are substantially reduced as compared with prior art devices, while at the same time reliability of joint formation is substantially enhanced.

It is therefore an object of the invention to provide a novel coupling device for forming a joint between pipe sections to be joined.

It is a further object of the invention to provide a pipe coupling device for forming a joint between pipe sections at a substantially reduced cost and more universally applicable under conditions or restricted accessibility as compared to prior art devices.

It is still a further object of the invention to provide a novel coupling device for forming a leakproof joint between pipe sections to be joined in which the mechanical seal for effecting the joint formation is produced in response to a connected hydraulic pressure.

Brief description of the drawings

FIG. 1 is a sectional view through a gasket type coupling embodiment of the invention in its manufactured state;

FIG. 2 is a sectional view through a variation of the previous embodiment as adapted for single end connection;

FIG. 3 is a sectional view through a further variation to provide increased holding strength;

FIG. 4 is a partial section illustrating the above embodiments deformed coupled in positive hold engagement effected by means of an applied hydraulic pressure;

FIG. 5 is a sectional view through a gasketless embodiment in its manufactured state as for metal-to-metal coupling;

FIG. 6 is a sectional view of the FIG. 5 embodiment in its coupled state; and

FIG. 7 is a sectional view through a reinforced embodiment in its manufactured state as for thin wall piping.

Description of the preferred embodiments

Referring now to FIG. 1, the coupling device in accordance with the first embodiment of the invention is generally designated 10 and comprises an elongated tubular shell which can extend longitudinally straight, or as shown, is shaped near each end with an annular arch, protuberance or bulge 12 and an annular corrugation 13 extending radially inward for containing an annular gasket 14. The gasket member 14 consists of synthetic or natural electrically insulating sealing materials, shaped to be received within the coupling end as to in turn receive and envelop a pipe end 18 and 19 (shown dashed) to be coupled. It is to be noted that the inside surface of the gasket member extends generally parallel to the shell axis while arch 12 and gasket narrow toward the coupling end until the former terminates in a mouth 21 which likewise extends generally parallel to the shell axis. While not essential, it is usual for the inside surface of the protuberance to be pre-coated with a low coefficient of friction material such as a Teflon coating material, wax solution or the like. As will be understood, this permits the gasket to slide relative to the metal during the hydraulic forging step in which the coupling seal is formed by deforming the arch and compressing the gasket. The gasket 14 may where required be adapted to provide electrical communication between the joined pipe sections as for cathodic protection under varying soil conditions to be encountered by the pipe when laid. To achieve this end, each gasket suitably is intended to provide electrical contact between the respective pipe section thereat and the adjacent shell portion and may, for example, comprise a type disclosed in U.S. Patent 3,259,406. This type gasket includes a metal coil 32 which after the coupling is forged for forming the joint is forced physically against both the pipe and the adjacent shell portion to effect a circuit contact between the elements.

Annularly encircling each end portion of the shell in order to form a pressure-tight chamber thereabout is an outer or pressure ring 24 which is joined to the shell along its peripheral side edges 25 and 26 by means of welding or the like. This latter ring, as can be seen, can be wholly or partially arched or can be relatively flat in longitudinal section. Whatever cross section, it is formed to extend or span over the arch 12 for a span length designated X on the drawing whereby to define a fluid tight annular passage 27 between the exterior enclosed surface thereat of the shell 11 and the interior surface of the pressure ring 24. Typically, the span length is at least one inch. The passage is preferably pre-filled with a non-compressible fluid such as available forms of automobile grease or the like via an aperture or port 29. The port itself extends through the pressure ring into communication with the passage and normally contains a removable plug 30 for sealing the passage against fluid leakage during storage and shipment.

The embodiment as illustrated in FIG. 2 is in most respects similar to that above except that the coupling unit hereof is adapted for single ended connection for coupling one pipe end as opposed to two pipe ends above.

FIG. 3 is likewise similar except that a plurality of arches 12 (usually two) are tandemly arranged each with gaskets for plural coupling of each pipe end. This embodiment provides increased holding strength where required.

Forming the joint by means of the coupling can be understood with reference to FIG. 4 wherein pipe sections to be joined 18 and 19, are first inserted through opposite ends of the coupling 10 to an appropriate position as indicated at least behind the gasket 14. Thereafter, a pressure source 36 such as a portable grease gun is connected to a first of the end passages 27 by means of a flexible hose 37 to a suitable fitting 38 inserted or otherwise contained in the port 29. Sufficient pressure is then developed to pressurize the pre-filled grease contained in the annular space 27 until the shell is constricted sufficiently to effect a positive hold between the gasket and pipe.

Generally speaking, the portion 12 of the shell initially responds to the hydraulic pressure to form a catenary section forged beyond its yield point in compression in effecting a permanent deformation thereof. Since the weld of the outer ring 24 thereto provides fixed ends, a stabilizing element is introduced which extends into the span from the ends for controlling maximum uniform compression toward the center. Other stabilizing effects are likewise provided by the corrugations 13 where employed which acts as a stiffening rib affording a "hinge" for metal movement and some endwise relief for metal flow during compression. After initial compression has taken up the clearance, contact with the pipe as via the gasket provides stabilization for final pressurizing.

On completing the joint as shown in FIG. 4, the pressure source is removed and applied to the opposite end in a similar manner. After the joint is completed at both ends, the plug 30 is reinserted in the respective ports so as to prevent ground moisture or other foreign matter from subsequently entering the annular space.

Each of the subsequent embodiments of FIGS. 5, 6 and 7 are similarly joined without a centrally compressible gasket member. Hence as shown in FIG. 5, the shell section appears flat for metal-to-metal contact against the surface of pipe 18. This embodiment finds utility under conditions in which it is impractical to employ an elastomer such as for use at high temperature. After applying the hydraulic pressure in the manner above, the shell 12 unites against the pipe causing slight uniform crushing or bellowing inward of the latter as can be seen in FIG. 6. Application of additional pressure may cause outward bulging of the pressure ring 24 as the resistance to shell deformation is reinforced by the engaged pipe as will be understood.

As shown in FIG. 7, the coupling is intended for a metal-to-metal seal with thin wall piping unable by itself to withstand the forging pressures applied to the coupling without crushing. This coupling embodiment therefore includes as shown an integrally contained coaxial and annular reinforcing sleeve 40 on which the pipe section is snugly received. Obviously, the sleeve can be supplied separate from the coupling and inserted into the pipe end before mounting the coupling thereon.

Critical to each of the above embodiments is the relative resistance to radial deformation of the pressure ring 24 compared to the shell end portion enclosed in the span length X. Generally, the ring should be selected of a combination of material strength and/or thickness having a substantially higher yield point than that of the shell section for hydraulic forging pressures on the order of 1000 to 10,000 p.s.i.g. which varies with pipe diameter. Typically, 12 inch pipe requires about 1,500 p.s.i.g. while 4 inch requires about 5,000–8,000 p.s.i.g. Accordingly, it is intended that the pressure when applied will cause deformation of the shell radially inward while causing imperceptible, if any deformation, on the pressure ring per se. Without this relationship, the effects of applied pressure would be relatively uncontrolled as to defeat the objectives sought to be achieved. A differential in yield of approximately 20,000 to 35,000 p.s.i.g. has been found to work well and can be achieved by material selection of AISI C1021 cold worked and AISI 1008 annealed for the ring and shell, respectively. For 4 inch pipe, the shell wall thickness should preferably be at least 3/16 inches to provide minimum factor of safety against localized collapse resulting from external forging thereof. In 6 inch and large size this wall thickness can be 5/32 inch or less without danger of localized collapse. This can be appreciated when considering that the effect of the forging should ensure uniform condensation of the metal annularly about the contained pipe.

By the above description there has been disclosed a novel pipe coupling device that is easily and simply installed more faster and under conditions that were impractical or even impossible with prior art devices. While not mentioned above, the use of suitable cementing materials can by employed to enhance the seal in the embodiments of FIGS. 5, 6 and 7. Cements such as epoxy, polyurethane, butyl rubber or the like can be employed for this purpose which will provide a firm grip and leak-proof joint. A metal-to-metal seal of this type finds particular use with line contents such as water, oil, steam, etc. Whereas "metal-to-metal" has been used to define a metal coupling unit with respect to metal pipe, the latter need not be metal and this reference shall be so construed.

Since many changes could be made in the above construction and many apparently widely different embodiments of this invention could be made without departing from the scope thereof, it is intended that all matter contained in the drawings and specification shall be interpreted as illustrated and not in a limiting sense.

What I claim is:
1. A pipe coupling comprising
  (a) a pipe receiving tubular elongated hollow shell permanently deformable radially inward toward contained pipe in response to a sufficient fluid pressure applied thereagainst, and

(b) a ring member annularly spanning a predetermined end portion of at least one end of said shell, said ring being secured axially at different locations spaced along said shell to define a pressure-tight chamber between the interior surface thereof and the exterior surface of said spanned end portion;

(c) said ring member including an inlet through which to receive an application of fluid pressure within the defined chamber for permanently deforming the shell portion thereat radially inward sufficient to effect a coupling relation with the contained pipe.

2. A pipe coupling according to claim 1 in which said ring member is constructed of strength relatively greater than said spanned shell portion to substantially resist deformation at an applied fluid pressure at which said spanned shell portion deforms.

3. A pipe coupling according to claim 1 in which said shell includes a ring member at each end thereof.

4. A pipe coupling according to claim 1 in which there is included a plurality of tandem ring members each spanning a predetermined end portion of at least one end of said shell.

5. A pipe coupling according to claim 1 in which the ring member is secured to the shell by means of annular welds at each edge thereof.

6. A pipe coupling according to claim 1 in which said spanned shell end portion is formed with an annular radially outward protuberance in which an elastomeric gasket is contained.

7. A pipe coupling according to claim 1 in which the ring has a yield strength about at least 20,000 p.s.i.g. greater than the spanned shell portion thereat.

8. A pipe coupling according to claim 1 in which the span length of the shell opposite the ring member measured linearly parallel to the shell axis is at least one inch.

9. A pipe coupling comprising
(a) a tubular elongated hollow shell having ends through which to receive pipe to be coupled portions of which are formed at least partially in an annularly radially outward protuberance with respect to the axis of said shell;

(b) each of said shell ends being permanently deformable radially inward toward contained pipe in response to a sufficient fluid pressure applied thereagainst;

(c) a gasket member contained extending within the protuberance at each end of said shell to envelop received pipe sections thereat; and (d) a pressure ring near each end of said shell annularly spanning a portion thereof including said protuberance and secured pressure-tight thereto to each define an annular pressure-tight chamber between the interior surface thereof and the exterior surface of the spanned shell portion thereat;

(e) each of said rings including an inlet through which to receive an application of fluid pressure within its respective chamber for permanently deforming the shell portion thereat radially inward sufficient to effect a coupling relation with the contained pipe.

10. A pipe coupling according to claim 9 in which said pressure rings are constructed of strength relatively greater than the spanned shell portion thereat to substantially resist radial deformation at an applied fluid pressure at which said end portion deforms radially inward against the gasket member.

11. A coupling according to claim 9 in which said gasket is substantially wedge shaped in transverse section.

12. A coupling according to claim 9 in which the interior surface of said protuberance contains a lubricant thereon.

References Cited

FOREIGN PATENTS 680,080  10/1952  Great Britain.

CARL W. TOMLIN, *Primary Examiner.*

T. E. CALLAGHAN, *Assistant Examiner.*

U.S. Cl. X.R.

285—94, 96, 382.2, 331; 29—421, 508, 516

PO-1050
(5/69)

UNITED STATES PATENT OFFICE
CERTIFICATE OF CORRECTION

Patent No. 3,429,587  Dated February 25, 1969

Inventor(s) George D. Kish

It is certified that error appears in the above-identified patent and that said Letters Patent are hereby corrected as shown below:

Column 6, after line 30 insert --

UNITED STATES PATENTS 2,083,842    6/1937   Henning    285-382 x --

Column 6, after line 33 add --

654,931     1/1963    Canada
1,371,303   7/1964    France --

SIGNED AND
SEALED
FEB 17 1970

(SEAL)
Attest:

Edward M. Fletcher, Jr.
Attesting Officer

WILLIAM E. SCHUYLER, JR.
Commissioner of Patents